United States Patent
Hendley et al.

(10) Patent No.: US 7,549,831 B2
(45) Date of Patent: Jun. 23, 2009

(54) LADDER RACK APPARATUS AND METHOD

(75) Inventors: John H. Hendley, Smyrna, GA (US);
John H. Fischer, Lilburn, GA (US);
Richard J. Renard, Prunedale, CA (US)

(73) Assignee: L & P Property Management Company, South Gate, CA (US)

( * ) Notice: Subject to any disclaimer, the term of this patent is extended or adjusted under 35 U.S.C. 154(b) by 569 days.

(21) Appl. No.: 11/425,272

(22) Filed: Jun. 20, 2006

(65) Prior Publication Data

US 2006/0245875 A1  Nov. 2, 2006

Related U.S. Application Data

(63) Continuation of application No. 10/653,447, filed on Sep. 2, 2003, now abandoned.

(60) Provisional application No. 60/408,532, filed on Sep. 5, 2002.

(51) Int. Cl.
*B60P 9/00* (2006.01)
*B60R 9/042* (2006.01)
*A47B 97/00* (2006.01)

(52) U.S. Cl. .................. 414/462; 224/310; 248/503

(58) Field of Classification Search .......... 414/462, 414/529, 490, 491, 466, 480; 182/127; 224/310, 224/324, 309; 248/503
See application file for complete search history.

(56) References Cited

U.S. PATENT DOCUMENTS

| | | |
|---|---|---|
| 3,058,607 A | 10/1962 | Kiley |
| 3,251,519 A | 5/1966 | Jones |
| 3,826,390 A | 7/1974 | Watson |
| 3,904,094 A | 9/1975 | Correll |
| 3,963,136 A | 6/1976 | Spanke |
| 4,170,331 A | 10/1979 | Faulstich |
| 4,262,834 A | 4/1981 | Nutt |
| 4,390,117 A | 6/1983 | Fagan |
| 4,618,083 A | 10/1986 | Weger, Jr. |
| 5,058,791 A | 10/1991 | Henriquez et al. |
| 5,242,094 A | 9/1993 | Finley |
| 5,297,912 A | 3/1994 | Levi |
| 5,398,778 A | 3/1995 | Sexton |

(Continued)

FOREIGN PATENT DOCUMENTS

FR  2622160  4/1989

OTHER PUBLICATIONS

Loadsrite Ladder Racks, Adrian Steel, LRLR20M0303, undated.

*Primary Examiner*—Gregory W Adams
(74) *Attorney, Agent, or Firm*—Wood, Herron & Evans, LLP

(57) ABSTRACT

A motorized ladder rack for loading or unloading a ladder on a vehicle is provided. The motorized ladder rack comprises a stationary front cradle, a pivotable and extendable rear cradle and a side rail. The rear cradle includes a motorized drive assembly which may be remotely controlled. The front and rear cradles are secured to the vehicle. The front cradle includes a support member, front and side guides removably secured to the support member and a side stop removably secured to the support member. The side rail is secured to the front and rear cradles and extends therebetween. The ladder rack is movable between a first position and a second position by activation of the motorized drive assembly.

21 Claims, 10 Drawing Sheets

U.S. PATENT DOCUMENTS

| | | |
|---|---|---|
| 5,421,495 A | 6/1995 | Bubik et al. |
| 5,603,591 A | 2/1997 | McLellan |
| 5,791,857 A | 8/1998 | Ziaylek, Jr. et al. |
| 5,850,891 A | 12/1998 | Olms et al. |
| 5,884,824 A | 3/1999 | Spring, Jr. |
| 6,092,972 A | 7/2000 | Levi |
| 6,099,231 A | 8/2000 | Levi |
| 6,315,181 B1 | 11/2001 | Bradley et al. |
| 6,360,930 B1 | 3/2002 | Flickenger |
| 6,427,889 B1 | 8/2002 | Levi |
| 2002/0084297 A1 | 7/2002 | Williams et al. |
| 2004/0026472 A1* | 2/2004 | Foo et al. .................. 224/310 |

* cited by examiner

LADDER RACK APPARATUS AND METHOD

CROSS REFERENCE TO RELATED APPLICATIONS

This application is a continuation of U.S. patent application Ser. No. 10/653,447 filed Sep. 2, 2003 entitled "LADDER RACK APPARATUS AND METHOD." U.S. patent application Ser. No. 10/653,447 claims the benefit of U.S. provisional Patent Application Ser. No. 60/408,532 filed Sep. 5, 2002 entitled "LADDER RACK APPARATUS AND METHOD." The disclosures of both of these applications are fully incorporated by reference herein.

BACKGROUND OF THE INVENTION

This invention relates to ladder racks. More particularly, this invention relates to racks for loading and unloading elongated items such as ladders onto and off of a vehicle for storage and transport.

Various ladder racks have been used on vehicles. Nevertheless, an improved ladder rack that provides straightforward, reliable operation, can secure ladders and other elongated items with respect to a vehicle, is relatively simple to manufacture, and/or makes ladder loading and unloading from a vehicle easier would be welcomed by those in the art.

SUMMARY OF THE INVENTION

The ladder rack of the present invention enables a user to load and unload ladders and other elongated items with respect to a vehicle. In some embodiments, the ladder rack has a front support member, a side rail, and a rear assembly. The front support member can have a front guide, a side guide, a side stop, and/or a side grip for guiding a ladder toward a storage position and for limiting movement of the ladder in the storage position. The side rail can be employed to help guide the ladder into and out of its storage position, make storage and retrieval of the ladder easier, and prevent damage to the vehicle by the ladder during ladder storage and retrieval.

In some embodiments, one or more of the front guide, side guide, side stop, and side grip are adjustable to accommodate and store ladders of different sizes. Other features of the invention will become apparent by consideration of the detailed description and accompanying drawings.

DETAILED DESCRIPTION OF THE PREFERRED EMBODIMENTS

Figure 1:
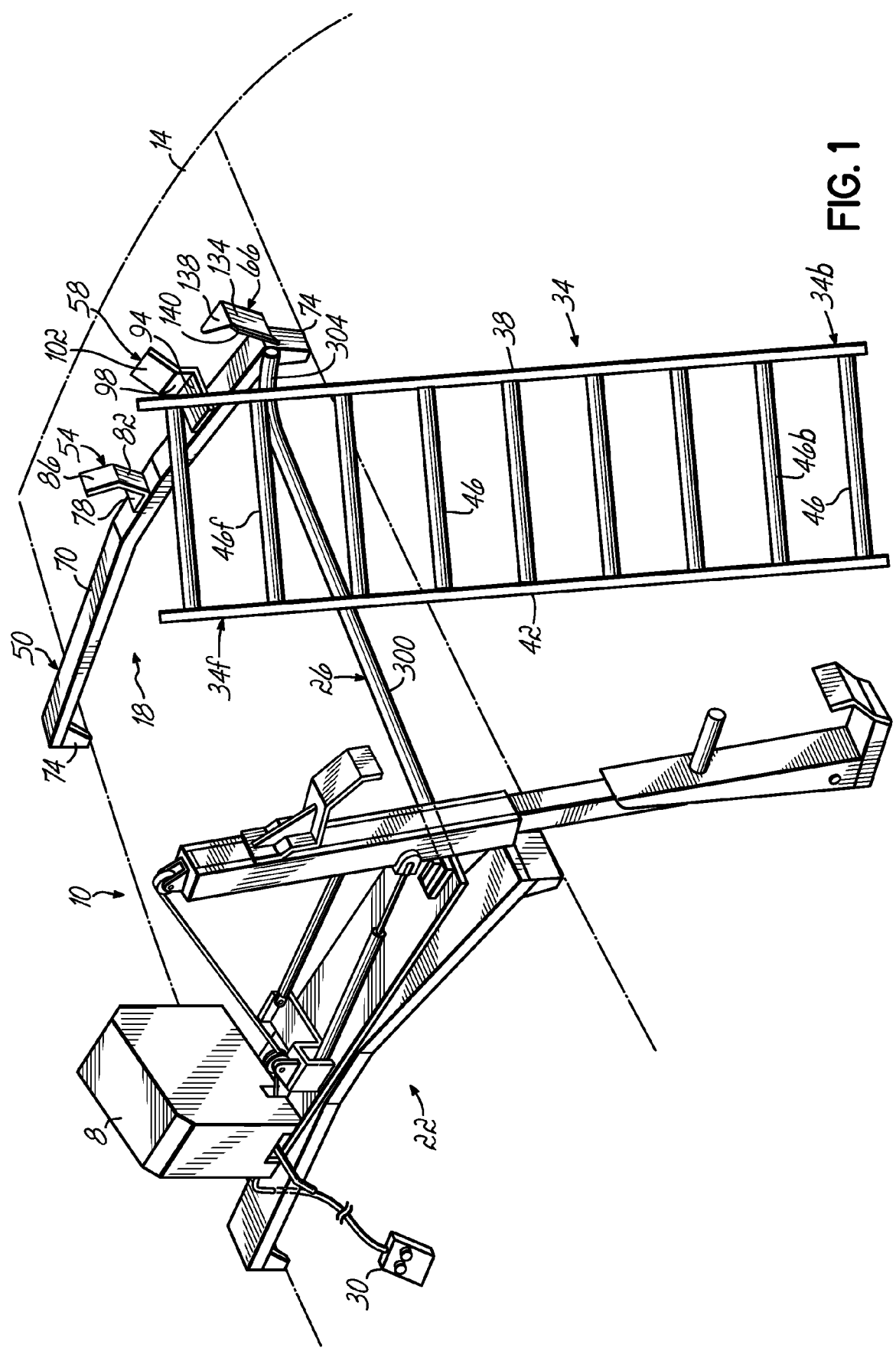
FIG. 1 is a perspective view of the ladder rack according to an embodiment of the invention, shown with the ladder rack in a load/unload position and with the ladder partially removed from the ladder rack.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. The various elements and combinations of elements described below and illustrated in the drawings can be arranged and organized differently to result in embodiments which are still within the spirit and scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," and "coupled" are used broadly and encompass both direct and indirect mounts, connections, and couplings. Further, "connected" and "coupled" are not restricted to physical or mechanical connections or couplings.

FIGS. 1-12 illustrate a motorized ladder rack 10 according to an exemplary embodiment of the present invention. The ladder rack 10 is shown mounted to a vehicle 14 in FIGS. 1-4 (e.g., a van 14 by way of example only). The ladder rack 10 includes a static or stationary front cradle 18 (which in alternative embodiments can be a movable structure), a pivotable and extendible rear cradle 22, and a side rail 26 connected to the front and rear cradles 18 and 22, respectively. The rear cradle 22 is preferably like the one disclosed in U.S. Pat. No. 5,850,891, the disclosure of which is fully incorporated herein. The ladder rack 10 further includes a control box 30 that allows an operator to control the movement of the ladder rack 10 between a first load/unload position (see FIG. 1) and a second storage or transport position (see FIG. 4) for loading and unloading elongated items such as ladders 34, tools, lumber, pipe, ducts, poles, and other items onto and off of the vehicle 14 for storage and transport. Accordingly, the following description is with reference to ladder racks by way of example and illustration only. The present invention finds application with respect to any elongated item which is desired to be stored and transported on a vehicle.

The ladder 34 includes a first side rail 38, a second side rail 42, and a plurality of rungs 46 extending between the first and second side rails 38 and 42, respectively. The ladder 34 can be a one-piece design, as shown, an extension ladder with a main section and one or more extension sections, a step ladder, or any other type of ladder.

Figure 10:
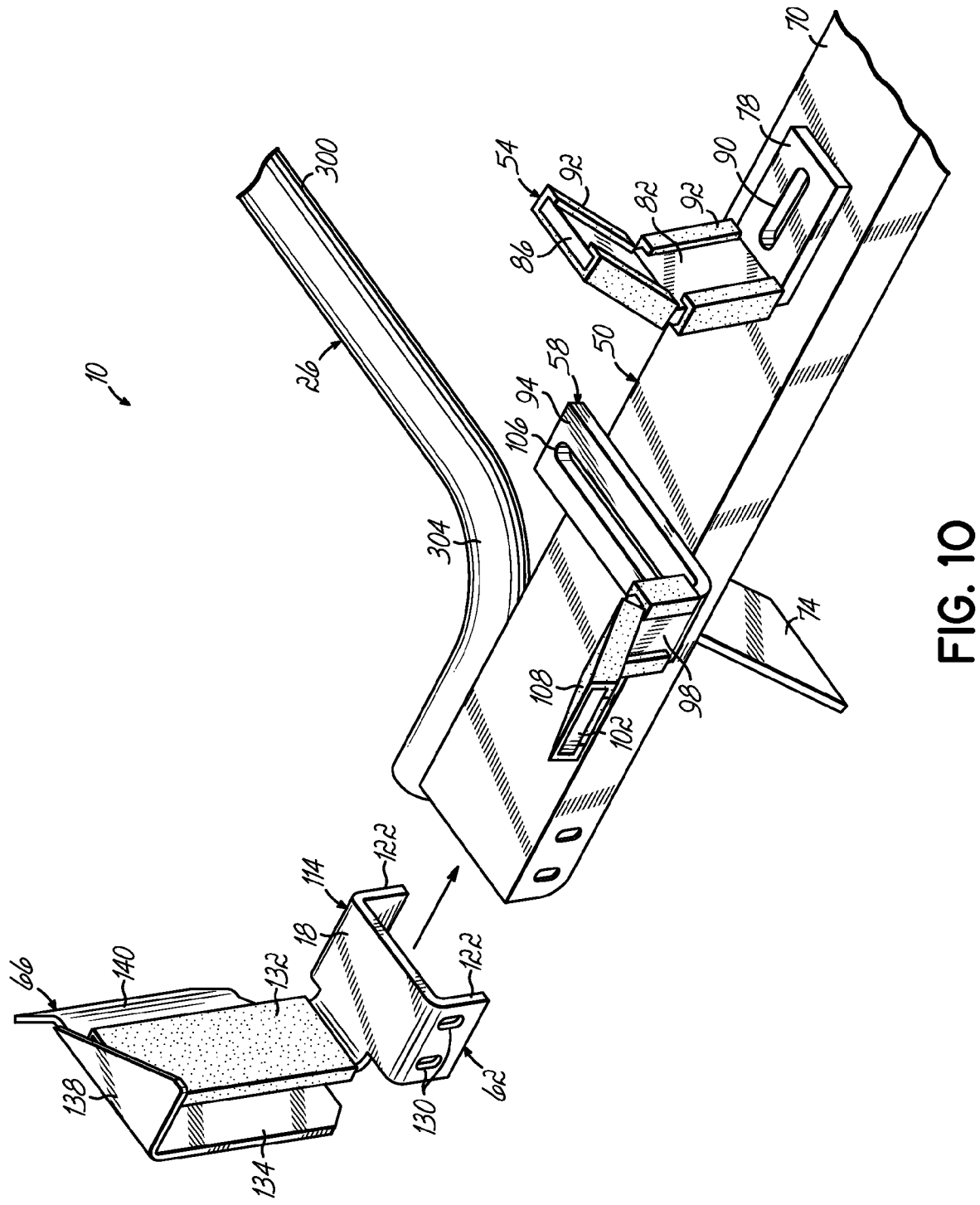
FIG. 10 is a perspective detail view of the front of the ladder rack illustrated in FIGS. 1-9.
Figure 11:
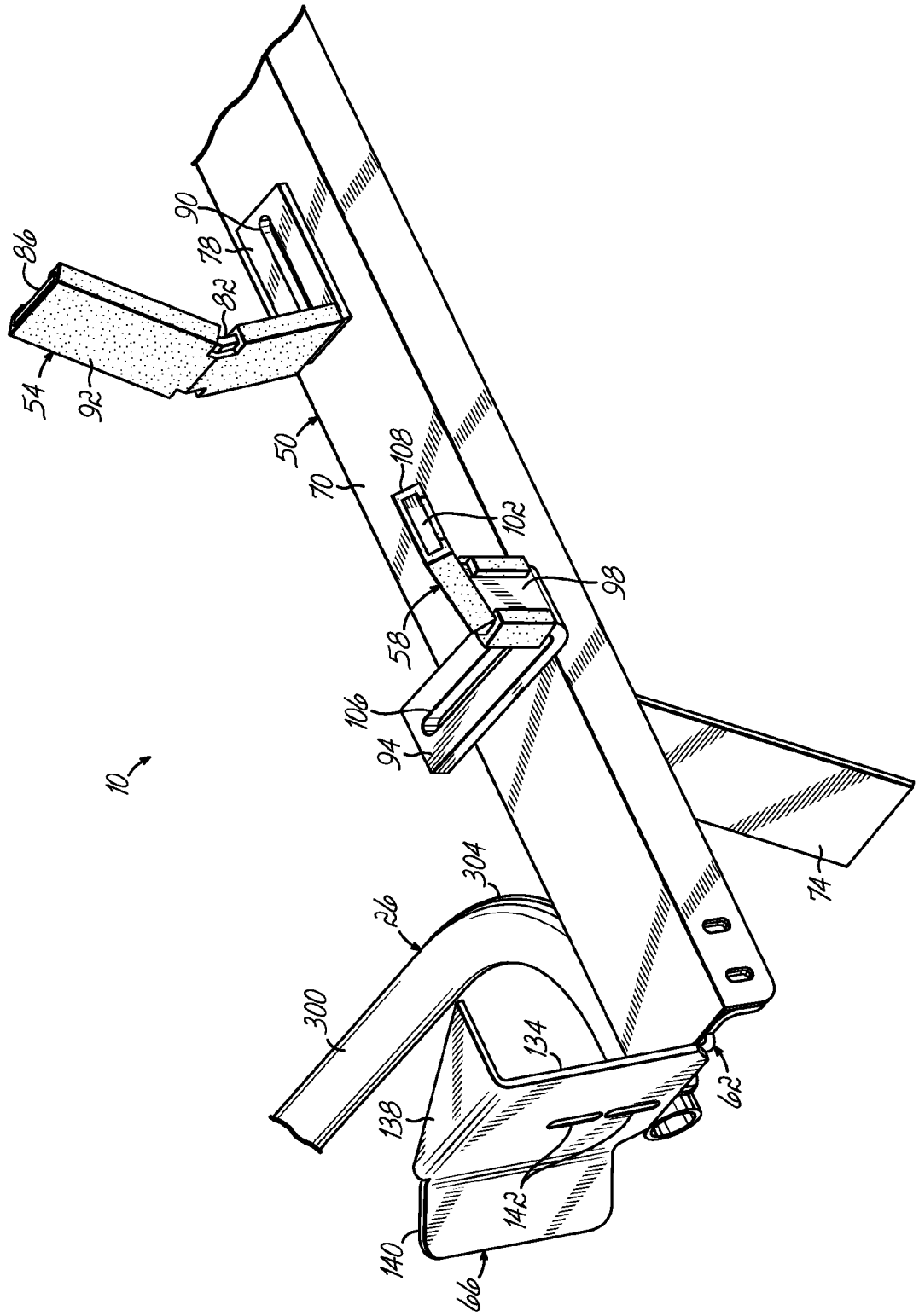
FIG. 11 is another perspective detail view of the front of the ladder rack illustrated in FIGS. 1-10.

With continued reference to the exemplary embodiment illustrated in the figures, the front cradle 18 includes a support member 50, a side guide 54 coupled to the support member 50, a front guide 58 coupled to the support member 50, a side stop 62 coupled to the support member 50, and a side grip 66 coupled to the side stop 62 (see FIGS. 10 and 11). In some embodiments, the side guide 54, the front guide 58, and the side stop 62 are removably coupled to the support member 50 (e.g., connected with releasable fasteners such as nuts and bolts). In other embodiments, the side guide 54, the front guide 58, and the side stop 62 are permanently coupled (e.g., connected with welding, brazing, rivets or other permanent fasteners, and the like) or integrally formed with the support member 50. As shown in FIG. 10, the side grip 66 can be removably or permanently coupled to the side stop 62 (such as in any of the manners just described with reference to the side and front guides 54, 58), so can be integral with the side stop 62.

The guides 54, 58, side stop 62, and side grip 66 can be permanently secured, releasably secured, and integral with respect to their connected structure in any combination desired (e.g., all elements 54, 58, 62, 66 releasably secured, the guides 54, 58 releasably secured while the side stop 62 and side grip 66 are integral with each other and/or the support member 50, all elements but the side grip 66 permanently secured to the support member 50, and the like). Any combination of element connections can be employed as desired.

The support member 50 in the illustrated embodiment includes a cross rail 70 and a pair of connection brackets 74 for connecting the cross rail 70 to the forward portion of the roof of the vehicle 14. In some embodiments, the connection brackets 70 are mounted to the rain gutters or drip rail of the vehicle 14 using a pair of clamp members (not shown). Other embodiments utilize other conventional connection techniques for permanently or releasably mounting the support member 50 to the vehicle 14.

In some embodiments, the cross rail 70 includes a formed piece of metal (e.g., steel, aluminum, and the like) having a plurality of connection apertures. Other embodiments of the cross rail 70 include tubular rails, rails having C, U, L, or I-shaped cross-sections, and other rail types adapted to support the side guide 54, the front guide 58, the side stop 62, and the side rail 26. The cross rail 70 can be a single element or can be constructed of any number of elements connected together, and can take any form capable of providing a mounting frame or other structure for the elements defining the front cradle 18. In this regard, the cross rail 70 can be one or more plates, rods, beams, bars, tubes, or other elements suitable for connection to the front and side guides 58, 54, the side stop 62, and the side rail 26.

As shown in FIG. 10, the side guide 54 in the illustrated embodiment includes a horizontally extending mounting portion 78, a vertically extending retaining portion 82, and an upwardly-inclined extending guiding portion 86. In some embodiments, the mounting, retaining, and guiding portions 78, 82, and 86, respectively, are integrally formed. In other embodiments, any two or more of the mounting, retaining, and guiding portions 78, 82, and 86, respectively, are removably and/or permanently coupled to one another, such as by being bolted, screwed, or pinned, by other fastened connections, by snap-fits or inter-engaging elements, and the like.

As discussed further below, as the ladder 34 is pivoted into place, the second rail 42 of the ladder 34 can contact the guiding portion 86 of the side guide 54 and can thereby be laterally directed towards the side stop 62. In such contact with the guiding portion 86 of the side guide 54, this lateral movement continues until the second rail 42 of the ladder 34 reaches the retaining portion 82 of the side guide 54, past which the second rail 42 moves vertically downward towards the cross rail 70. The retaining portion 82 prevents the ladder 34 from moving laterally towards the center of the roof of the vehicle 14.

Figure 9:
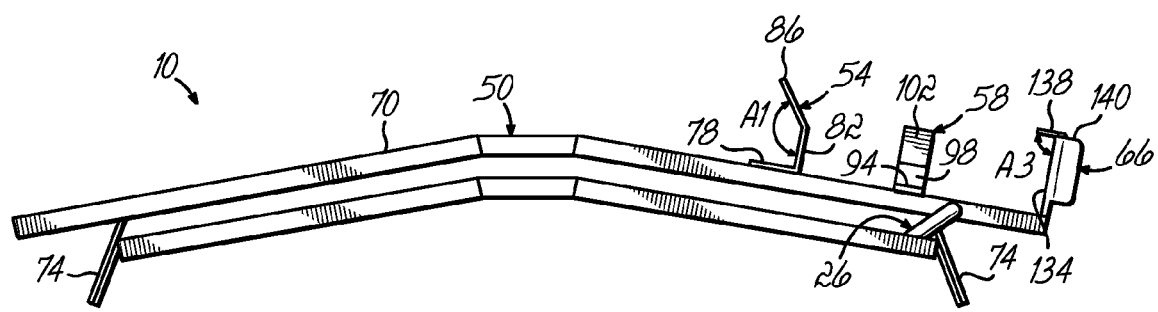
FIG. 9 is a rear elevational view of the ladder rack illustrated in FIGS. 1-8.

With reference to FIG. 9, the angle A1 formed between the retaining portion 82 and the guiding portion 86 of the exemplary illustrated side guide 54 is sized to facilitate lateral movement of the ladder 34 towards the side stop 62. In some embodiments, the angle A1 is between 125 and 165 degrees. In other embodiments, the angle A1 falls between 135 and 155 degrees. In still other embodiments, the angle A1 is approximately 145 degrees. Depending at least partially upon the type and size of ladder to be loaded and stored in the ladder rack 10 and upon the relationship between the elements of the ladder rack 10, the angle A1 can vary outside the above-noted ranges. Regardless of the angle A1, the guiding portion 86 in some embodiments is sized and oriented to incline upwardly to the extent necessary to contact and guide the second rail 42 as the ladder 34 is pivoted towards the storage/transport position.

Figure 4:
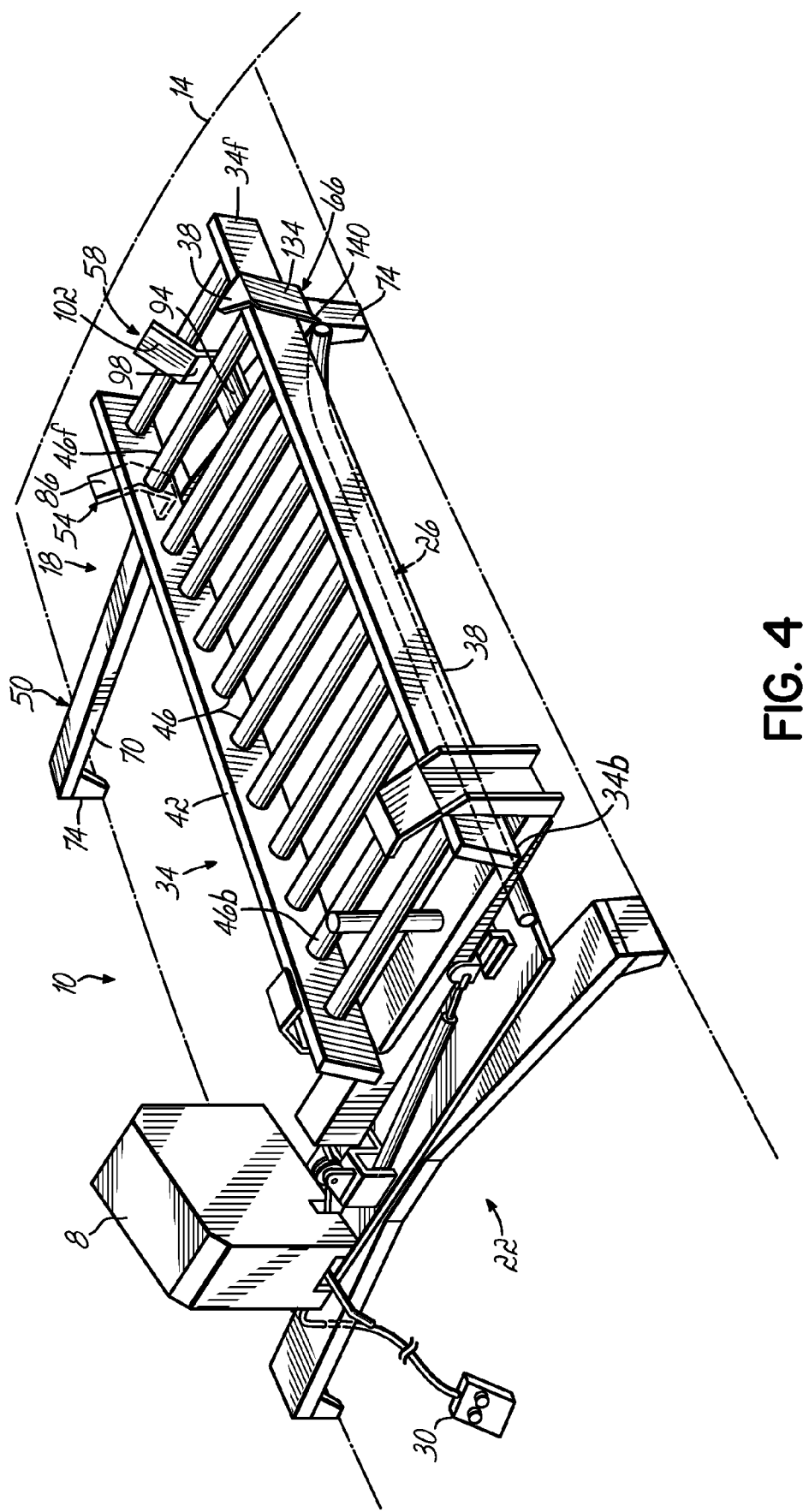
FIG. 4 is a perspective view of a ladder rack illustrated in FIGS. 1-3, shown installed on the roof of a vehicle and in a storage/transport position.

In some embodiments including the illustrated embodiment, the mounting portion 78 of the side guide 54 extends sidewardly in the same general direction as the guiding portion 86 of the side guide 54 so that the second rail 42 of the ladder 34 rests on the cross rail 70 when the ladder rack 10 is in a storage/transport position (shown by way of example in FIG. 4). In other embodiments, the mounting portion 78 of the side guide 54 extends sidewardly in a direction opposite the guiding portion 86 so that the second rail 42 of the ladder 34 rests on the mounting portion 78 when the ladder rack 10 is in the storage/transport position. In still other embodiments, the mounting portion 78 extends in any other manner with respect to the cross rail 70 for connection thereto.

The mounting portion 78 of the side guide 54 can include one or more apertures for connection to the support member 50 and in particular the cross rail 70 (or other framework or structure of the ladder rack 10 as mentioned above). As best illustrated in FIG. 10, the side guide 54 can have one or more elongated mounting apertures 90 that allow for adjustability in the position of the side guide 54 with respect to the support member 50 and in particular the cross rail 70 of the support member 50. At least one fastener (e.g., a bolt, screw, pin, and the like) can be received through the mounting aperture 90 and a corresponding connection aperture in the cross rail 70 to connect the side guide 54 to the cross rail 70 of the support member 50. In other embodiments, the cross rail 70 has one or more elongated apertures for this same purpose. In still other embodiments, the cross-rail 70 and/or the side guide 54 can have multiple apertures that can be aligned in different manners to adjustably connect the side guide 54 to the cross rail 70. Any other manner of adjustably connecting the side guide 54 to the cross rail 70 (or other framework or structure of the ladder rack 10) can be employed as desired, including without limitation a groove in the cross rail 70 within and along with one or more screw, pins, bolts, or other fasteners that can be releasably secured, a sliding relationship in which the side guide 54 extends around at least part of the cross rail 70 and is slidable and securable in different locations thereon, and the like. All such manners of adjustable connection fall within the spirit and scope of the present invention.

With reference again to the elongated mounting aperture 90 in the illustrated embodiment of the present invention, the length of the mounting aperture 90 can be sized to allow for adjustment in the position of the side guide 54 so that ladders 34 of varying widths are accommodated on the ladder rack 10. Similarly, in other embodiments employing other manners of adjustability, the adjustability of the side guide 54 can be adapted to enable ladders of different widths to be received within the ladder rack 10.

When the ladder rack 10 is installed on the vehicle 14, the position of the side guide 54 can be adjusted with respect to the support member 50 to accommodate the width of the ladder 34 the operator intends to transport using the ladder rack 10. In some embodiments, the position of the side guide 54 is adjusted until approximately a 0.125 inch (0.3175 cm) gap exists between the side guide 54 and the second rail 42 of the ladder 34 when the first rail 38 of the ladder 34 is against the side stop 62. If the ladder 34 transported using the ladder rack 10 is replaced, the position of the side guide 54 can be adjusted to accommodate the width of the replacement ladder 34.

As best illustrated in FIG. 10, in some embodiments, the side guide 54 includes a cover 92 over either or both of the retaining and guiding portions 82 and 86, respectively. The cover 92 protects the ladder 34 from damage and/or that can provide enhanced movement of the second rail 42 of the ladder 34. The cover 92 can be made of any material suitable for this purpose, including without limitation nylon, Teflon (DuPont Corporation), plastic (e.g., ultra high molecular weight (UHMW) plastic such as Solus #HHSS-0432-C), urethane, and the like. Although the cover 92 can be made of low-friction material, any other material can instead by employed, such as rubber or foam for protection against scraping, metal for durability, and the like.

Although the side guide 54 in the illustrated embodiment has three portions 78, 82, 86 as described above, it will be appreciated that the side guide 54 can have other shapes while still performing any one or more of the functions described above. By way of example only, the side guide 54 need not necessarily have a mounting portion 78 (whether extending in the directions described above or otherwise), and in this regard can be connected to and extend from the cross rail 70 without the need for such a portion 78. Side guides 54 that do not have a mounting portion as described above can be integral with the cross rail 70, can be welded at their retaining portions 82 to the cross rail 70, can be shaped to inter-engage with the cross rail 70 (e.g., via pin and aperture connections, tab and groove connections, etc.), and the like.

As another example, some alternative side guides 54 need not necessarily have both retaining and guiding portion 82, 86 as described above and illustrated in the figures. In some cases, the guiding portion 86 can extend and be connected directly to the cross rail 70, or the side guide 54 can have no guiding portion 86. In still other cases, the side guide 54 can be defined at least partially by an element extending from the cross rail 70 to define a continuous curved or stepped surface that both guides and retains a ladder within the ladder rack 10.

As best illustrated in FIG. 10, the front guide 58 in the illustrated embodiment includes a horizontally extending mounting portion 94, a vertically extending retaining portion 98 extending upwardly from one edge of the mounting portion 94, and a guiding portion 102 extending upwardly and forwardly from an upper portion of the mounting portion 94. In some embodiments, the mounting, retaining, and guiding portions 94, 98, and 102, respectively, are integrally formed. In other embodiments, any two or more of the mounting, retaining and guiding portion 94, 98, and 102, respectively, are removably and/or permanently coupled to one another, such as be being bolted, screwed, or pinned, by other fastened connections, by snap-fits or inter-engaging elements, and the like.

As the ladder 34 is pivoted into place, a rung 46f can contact the guiding portion 102 of the front guide 58 depending at least partially upon the position of the ladder 34 with respect to the front guide 58 (e.g., in some cases, if a rung 46b is not appropriately contacting the rear cradle 22). When the rung 46f contacts the guiding portion 102 of the front guide 58, the ladder 34 can be longitudinally directed rearwardly towards the rear cradle 22. In such contact with the guiding portion 102, this longitudinal movement continues until the rung 46f reaches the retaining portion 98 of the front guide 58, past which the rung 46f of the ladder 34 moves vertically downward towards the cross rail 70. The retaining portion 98 of the front guide 58 can engage the rung 46f of the ladder 34 and can prevent the ladder 34 from moving forward on the vehicle 14. See FIG. 4.

Figure 7:
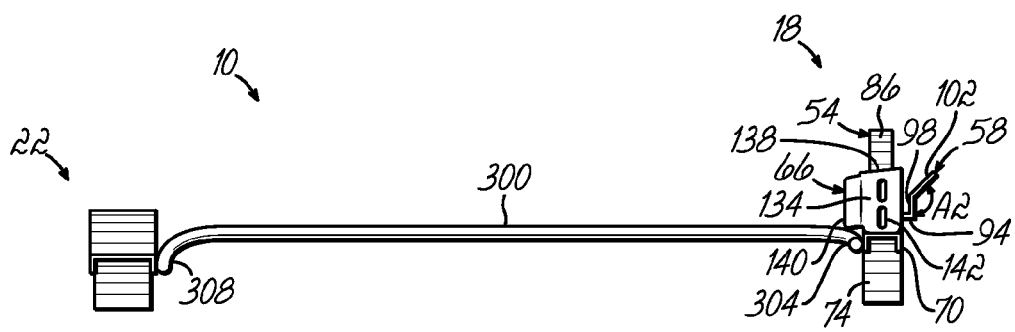
FIG. 7 is a side elevational view of the ladder rack illustrated in FIGS. 1-6.

With reference to FIG. 7, the angle A2 formed between the retaining portion 98 of the front guide 58 and the guiding portion 102 of the exemplary illustrated front guide 58 is sized to facilitate longitudinal movement of the ladder 34 towards the rear cradle 22. In one embodiment, the angle A2 is between 115 and 155 degrees. In other embodiments, the angle A2 falls between 125 and 145 degrees. In still other embodiments, the angle A2 is approximately 135 degrees. Depending at least partially upon the type and size of the ladder to be loaded and stored in the ladder rack 10 and upon the relationship between the elements of the ladder rack 10, the angle A2 can vary outside the above-noted ranges. Regardless of the angle A2, the guiding portion 102 in some embodiments is sized and oriented to extend forwardly to the extent necessary to contact and guide the rung 46b as the ladder 34 is pivoted towards the storage/transport position.

In some embodiments, the mounting portion 94 of the front guide 58 extends rearwardly in an opposite direction as the guiding portion 102 so the rung 46f of the ladder 34 rests above the mounting portion 94 when the ladder rack 10 is in the storage/transport position (shown by way of example in FIG. 4). In other embodiments, the mounting portion 94 of the front guide 58 extends forwardly in the same general direction as the guiding portion 102 of the front guide 58 so that the rung 46f of the ladder 34 rests above the cross rail 70 when the ladder rack 10 is in the storage/transport position. In still other embodiments, the mounting portion 94 of the front guide 58 extends in any other manner with respect to the cross rail 70 for connection thereto.

As best shown in FIG. 10, the mounting portion 94 of the front guide 58 can include one or more apertures for connection to the cross rail 70 (or other framework or structure of the ladder rack 10 as mentioned above). In some cases, the front guide 58 can have one or more elongated mounting apertures 106 that allow for adjustability in the position of the front guide 58 with respect to the support member 50. At least one fastener (e.g., a bold, screw, pin, and the like) can be received through the mounting aperture 106 and a corresponding connection aperture in the cross rail 70 to connect the front guide 58 to the support member 50. In other embodiments, the cross rail 70 has one or more elongated apertures for this same purpose. In still other embodiments, the cross rail 70 and/or the front guide 58 can have multiple apertures that can be aligned in different manners to adjustably connect the front guide 58 to the cross rail 70. Any other manner of adjustably connecting the front guide 58 to the cross rail 70 can instead be employed, including those described above with reference to the connection between the side guide 54 and the cross rail 70.

The length of the mounting aperture 106 can be sized to allow for adjustment in the position of the front guide 58 so that ladders 34 having differing spacings between the rungs 46f and 46b are accommodated on the ladder rack 10. If the ladder 34 transported using the ladder rack 10 is replaced, the position of the front guide 58 can be adjusted to accommodate a different spacing between the rungs 46f, 46b as needed for a different ladder 34. Also, different vehicles 14 may require placement of the front and rear cradles 18 and 22, respectively, in different locations on the vehicles 14, thereby resulting in different spacings between the front and rear cradles 18 and 22, respectively (possibly further requiring an adjustable side rail 26 and/or a differently sized side rail 26). Therefore, for a ladder 34 having a fixed spacing between the rungs 46f and 46b, the location of the front guide 58 may need to be adjusted to accommodate the spacing between the rungs 46f and 46b when the ladder rack 10 is installed on different vehicles 14. In other embodiments of the present invention employing other manners of front guide adjustability, the adjustability of the front guide 58 can be adapted to enable ladders having different rung spacings to be received within the ladder rack 10.

Thus, when the ladder rack 10 is installed on the vehicle 14, the position of the front guide 58 can be adjusted with respect to the support member 50 to accommodate the spacing between the rungs 46f and 46b of the ladder 34 the operator intends to transport using the ladder rack 10. In some embodiments, the position of the front guide 58 is adjusted until approximately a 0.25 inch (0.635 cm) gap exists between the front guide 58 and the rung 46f when the rung 46b is appropriately contacting the rear cradle 22.

In some embodiments, the front guide 58 includes a cover 108 that protects the ladder 34 from damage and/or that can provide enhanced movement of the rung 46f (e.g., over either or both of the guiding and retaining portions 102 and 98, respectively). The cover 108 can be made of any material suitable for this purpose, including those described above with reference to the cover 92 for the side guide 54 of the ladder rack 10.

Although the front guide 58 in the illustrated embodiment has three portions 94, 98, 102 as described above, it will be appreciated that the front guide 58 can have other shapes while still performing any one or more of the functions described above. By way of example only, the front guide 58 need not necessarily have a mounting portion 94 (whether extending in the directions described above or otherwise), and in this regard can be connected to and extend from the cross rail 70 without the need for such a portion 94. Front guides 58 that do not have a mounting portion as described above can be integral with the cross rail 70, can be welded at their retaining portions 98 to the cross rail 70, can be shaped to inter-engage with the cross rail 70 (e.g., via pin and aperture connections, tab and groove connections, etc.), and the like.

As another example, some alternative front guides 58 need not necessarily have both retaining and guiding portions 98, 102 as described above and illustrated in the figures. In some cases, the guiding portion 102 can extend and be connected directly to the cross rail 70, or the front guide 58 can have no guiding portion 102. In still other cases, the front guide 58 can be defined at least partially by an element extending from the cross rail 70 to define a continuous curved or stepped surface that both guides and retains a ladder within the ladder rack 10.

Figure 12:
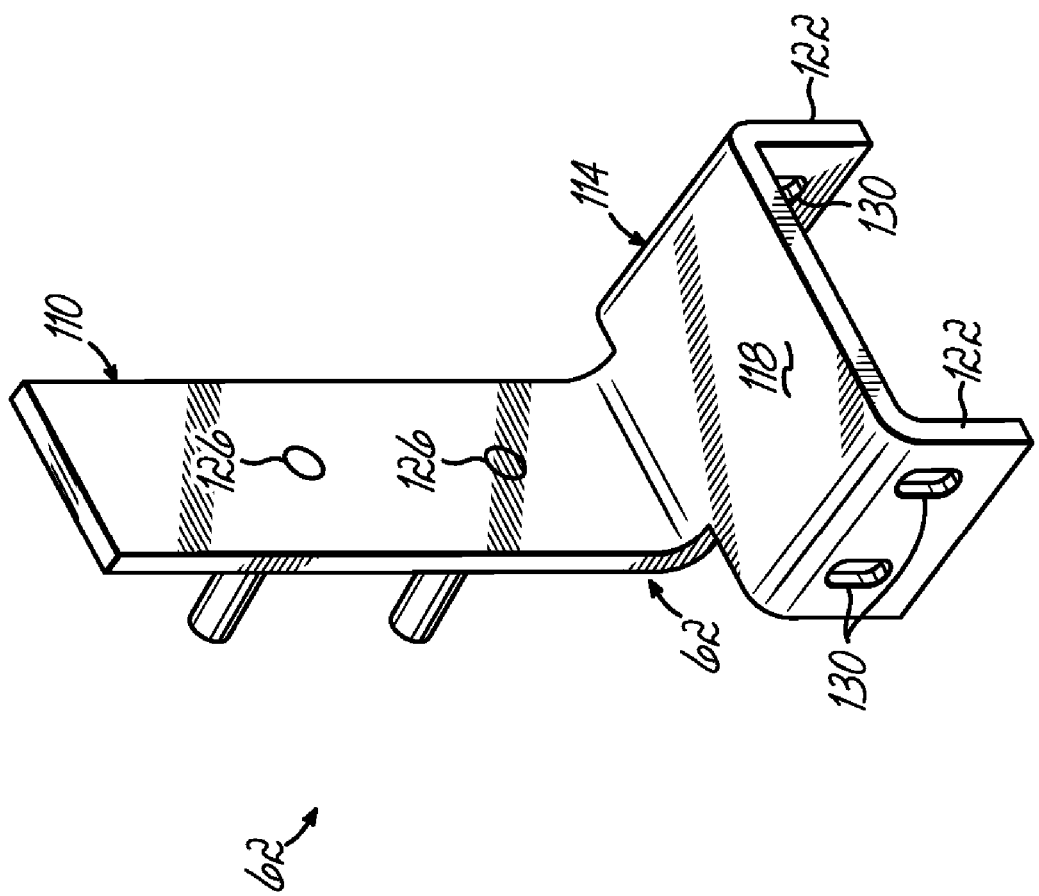
FIG. 12 is a perspective view of the side stop of the ladder rack illustrated in FIGS. 1-11.

As best show in FIG. 12, the side stop 62 in the illustrated embodiment includes a vertically extending retaining portion 110 and a mounting portion 114 having a horizontally extending portion 118 and two downwardly extending tab portions 122. In some embodiments, the retaining and mounting portions 110 and 114, respectively, are integrally formed. In other embodiments, the retaining and mounting portions 110 and 114, respectively, are removably and/or permanently coupled to one another, such as being bolted, screwed, or pinned, by other fastened connections, by snap-fits or inter-engaging elements, and the like.

As discussed further below, as the ladder 34 is pivoted into place, the first rail 38 of the ladder 34 can be laterally directed towards the side stop 62 (such as by the second rail 42 of the ladder 34 moving down the guiding portion 86 of the side guide 54) depending at least partially upon the position of the ladder 34 with respect to the side guide 54 and side stop 62. Such lateral movement continues until the second rail 42 reaches the retaining portion 82 of the side guide 54 as described above, past which the second rail 42 moves vertically downward towards the cross rail 70. When the ladder 34 is in the storage/transport position, the first and second rails 38 and 42, respectively, are situation between the retaining portion 82 of the side guide 54 and the retaining portion 110 of the side stop 62. The retaining portion 110 can prevent the ladder 34 from moving laterally away from the center of the vehicle 14.

In some embodiments, the retaining portion 110 of the side stop 62 includes at least one mounting aperture 126 that allows a side grip 66 to be connected to the side stop 62 (see FIGS. 10 and 11). As will be described in greater detail below, the side grip 66 (if employed) can help to retain the front portion of the ladder 34 within the ladder rack 10. The side grip 66 can be connected to the side stop 62 in any manner desired. By way of example only, a stud fastener can be press-fit into the mounting aperture 126, a pin or threaded rod can extend from the retaining portion 110 for connection to the side grip 66, a bolt, screw, rivet, or other conventional fastener can be passed through the aperture 126 for connection to the side grip 66, and the like. Alternatively, any other manner of connecting the side stop 62 to a side grip 66 (if employed) can instead by employed as desired, including the manners of connection described above with reference to the side guide 54 and cross rail 70. In such cases, the retaining portion 110 need not necessarily have mounting apertures 126 as just described.

The tab portions 122 of the side stop 62 can be employed to connect the side stop 62 to the cross rail 70 and/or side rail 26 (described in greater detail below). As shown in FIG. 12, the tab portions 122 can include one or more mounting apertures 130 through which fasteners (e.g., bolts, screws, rivets, pins, and the like) can be passed for connection of the side stop 62 to the cross rail 70. These fasteners can pass through mating apertures in the cross rail 70. Alternatively, the side stop 62 can be connected to the cross rail 70 in any conventional manner, including without limitation by welding, bolting, screwing, snap-fitting, inter-engaging elements, and the like. The connection location(s) need not necessarily be via tab portions 122 of the side stop 62, and can instead be in any other location on the side stop 62 desired, such as on the horizontally extending portion 118, along one or more edges of the horizontally extending portion 118, and the like. In some embodiments, the side stop 62 can be adjustably connected to the cross rail 70. In particular, the side stop 62 can be adjustably connected to the cross rail 70 in any of the manners described above with reference to the adjustable positions of the side and front guides 54, 58.

In some embodiments, the side stop 62 includes a cover 132 that protects the ladder 34 from damage and/or that can conceal the head of a fastener placed through the mounting aperture 126. This cover can be made of any material suitable for this purpose, including those described above with reference to the cover 92 for the side guide 54 of the ladder rack 10.

Although the side stop 62 in the illustrated embodiment of FIG. 12 has a horizontally extending position 118, a retaining portion 110, and tab portion 122 as described above, it will be appreciated that the side stop 62 can have other shapes while still performing any one or more of the functions described above. By way of example only, the side stop 62 need not necessarily have tab portions 122, such as in cases where the side stop 62 is connected to the cross rail 70 or other ladder rack structure in other manners. Alternatively, the side stop 62 can have one or more tab portions 122 that are shaped differently from those illustrated in the figures. As another example, the side stop 62 need not necessarily have a horizontally extending portion as described above, such as in cases where the retaining portion 110 is connected directly to the cross rail 70 (e.g., in any of the manners described above with reference to the side and front guides 54, 58). Still other side stop shapes are possible, each capable of preventing or limiting lateral movement of a ladder 34 within the ladder rack 10.

With reference now to FIGS. 10 and 11, the side grip 66 in the illustrated embodiment includes a vertically extending mounting portion 134 and a horizontally extending retaining portion 138. In some embodiments, the mounting and retaining portions 134 and 138, respectively, are integrally formed. In other embodiments, the mounting and retaining portions 134 and 138, respectively, are removably and/or permanently coupled to one another, such as by being bolted, screwed, or pinned, by other fastened connections, by snap-fits or inter-engaging elements, and the like.

As discussed further below, as the ladder 34 is pivoted into place, the first rail 38 of the ladder 34 can be laterally directed towards the side stop 62. Such lateral movement moves the first rail 38 of the ladder 34 under the retaining portion 138 of the side grip 66. The retaining portion 138 of the side grip 66 prevents the ladder 34 from moving vertically away from the roof of the vehicle 14.

With reference to FIG. 9, the angle A3 between the mounting portion 134 and the retaining portion 138 of the exemplary illustrated side grip 66 is sized to facilitate lateral movement of the ladder 34 towards the side stop 62 and under the retaining portion 138 while maintaining a small distance (or no distance) between the first side rail 38 and the retaining portion 138 when the ladder rack 10 is in the storage/transport position. In some embodiments, the angle A3 is between 70 and 110 degrees. In other embodiments, the angle A3 falls between 80 and 100 degrees. In still other embodiments, the angle A3 is approximately 90 degrees. Depending at least partially upon the type and size of ladder to be loaded and stored in the ladder rack 10 and upon the relationship between the elements of the ladder rack 10, the angle A3 can vary outside the above-noted ranges. As the angle A3 deviates from 90 degrees, the amount of potential contact area between the first side rail 38 of the ladder 34 and the retaining portion 138 of the side grip 66 can diminish. In some embodiments, the vertical height of the mounting portion 134 is adjustable to maintain the retaining portion 138 near the first side rail 38 of the ladder 34. The mounting portion 134 of the side grip 66 can be adjustable in any manner, including without limitation two or more vertically-spaced apertures in the side stop 62 and/or the side grip 66 through which one or more fasteners can be passed in different relative positions of the side stop 62 and side grip 66, one or more releasable clamps securing the side grip 66 in different vertical positions on the side stop 62, an elongated aperture in the side stop 62 and/or side grip 66 in which a bolt, screw, or other convention fastener can be tightened to secure the side stop 62 in different vertical positions with respect to the side grip 66, and the like.

The retaining portion 138 of the side grip 66 can have any shape desired, including without limitation a rectangular shape, a rounded or curved shape, an elongated shape, etc. In some embodiments, the retaining portion 138 is triangular in shape as shown in the figures in order to provide proper clearance for the ladder 34 (e.g., the first side rail thereof) as the ladder 34 is being moved to and from a loading/uploading position as described in greater detail below. A triangular retaining portion 138 has been found to provide adequate strength for retaining the front of the ladder 34 in the ladder rack 10 while still enabling clear movement of the ladder 34 in movement of the ladder rack 10.

In some embodiments of the present invention, a portion of the side grip 66 or side stop 62 is positioned to help guide a ladder 34 as the ladder 34 is being loaded and unloaded with respect to the ladder rack 10. In the illustrated embodiment for example, the side grip 66 has a rearwardly extending flange 140 that can assist in directing a ladder 34 being loaded and/or unloaded from the ladder rack 10. The flange 140 can be rearwardly and outwardly oriented (with respect to the vehicle 14) to perform this function as best shown in FIGS. 10 and 11. Such a flange 140 can instead or in addition extend from the side stop 62, and in either case can take any shape desired to perform the above-described ladder guiding function. In some embodiments, the flange 140 extends at an angle A4 between 90 and 180 degrees from a forward orientation with respect to the vehicle 14. In other embodiments, the flange 140 extends at an angle A4 between 120 and 150 degrees from a forward orientation. In still other embodiments, the flange extends at approximately at 135 degree angle A4 from a forward orientation.

The mounting aperture 134 of the illustrated side grip 66 includes one or more elongated mounting apertures 142 adapted to receive a fastener placed through the mounting aperture 126 for connecting the side grip 66 to the side stop 62. The elongated mounting apertures 142 allow for adjustability in the position of the side grip 66 with respect to the side stop 62 and thus the support member 50. The length of the mounting aperture(s) 142 can be selected to permit adjustment in the position of the side grip 66 so that ladders 34 of varying thickness can be accommodated on the ladder rack 10.

In some embodiments of the present invention employing an adjustable side grip 66, the position of the side grip 66 can be adjusted with respect to the support member 50 to accommodate the thickness of the ladder 34 the operator intends to transport using the ladder rack 10. In some embodiments, the position of the side grip 66 is adjusted until approximately a 0.25 inch (0.635 cm) gap exists between the retaining portion 138 and the first side rail 38 of the ladder 34 when the ladder rack 10 is in the storage/transport position as shown in FIG. 4. If the ladder 34 transported using the ladder rack 10 is replaced with a ladder having different dimensions, the side grip 66 can be adjusted to accommodate the thickness of the replacement ladder 34.

In some embodiments, the side grip 66 includes a coating (not shown) that protects the ladder 34 from damage and provides enhanced resistance to the movement of the ladder 34 away from vehicle 14. The coating can include a plastic or vinyl dip material (e.g., a Plastisol compound provided by VynaFlex Plastisol Compounds of Arnold, Mo.), a foam, rubber, or urethane material, or any other material suitable for protecting the ladder 34 and the side grip 66 from damage and/or wear. Such a coating can also be employed in place of or in addition to the covers 92, 108 for the side and front guides 54, 58. If desired, the side grip 66 can be also or instead be provided with a cover such as those described above with reference to the side and front guides 54, 58 and the side stop 62.

In some embodiments, the rear cradle 22 includes the motorized drive assembly for moving the ladder to and from a stored position on the vehicle 14. A number of different conventional motorized assemblies for ladder racks can be employed for this purpose. By way of example only, the rear cradle 22 in the illustrated embodiment is provided with the motorized ladder rack assembly commercially sold by Tailgater of Salinas, Calif. and described in U.S. Pat. No. 5,850, 891, the disclosure of which is incorporated herein by reference. Any other automated (e.g., motorized or otherwise) or non-automated motion assembly can instead by employed to partially or fully automate movement of the ladder 34 between storage and loading/unloading positions.

Although the ladder rack 10 of the present invention is described above as being motorized, it should be noted that this feature is not required to practice the present invention. In particular, the ladder rack 10 of the present invention can be manually moved between storage and loading/unloading positions in any manner, such as by one or more cranks, swing arms, handles, and the like. A number of such elements and mechanisms exist in the art, all of which fall within the spirit and scope of the present invention.

Figure 5:
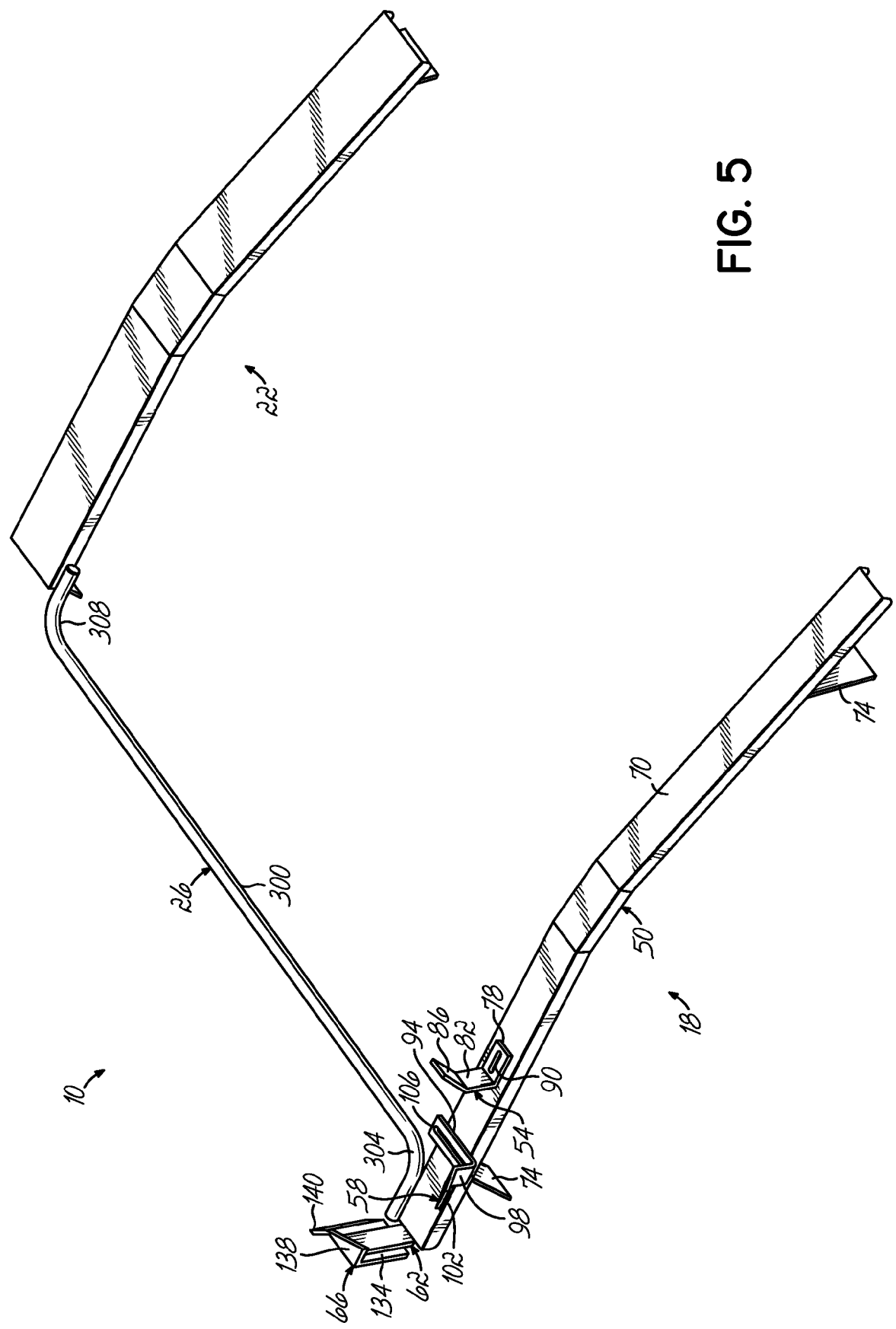
FIG. 5 is a front perspective view of the ladder rack illustrated in FIGS. 1-4, shown removed from the vehicle.

As shown in FIG. 5, the side rail 26 in the illustrated embodiments includes a main linear or straight portion 300, a curved or arcuate forward connection portion 304, and a curved or arcuate rear connection portion 308. In some embodiments, the main, forward connection, and rear connection portions 300, 304, and 308, respectively, are integral with one another. In other embodiments, the main, forward connection, and rear connection portions 300, 304, and 308, respectively, are removably and/or permanently coupled to one another, such as by being bolted, screwed, or pinned, by other fastened connections, by snap-fits or inter-engaging elements, by telescoping engagement with one another, by clamps, and the like. Thus, the length of side rail 26 can be adjusted in some embodiments to accommodate different sized and shaped vehicles 14 and ladders 34.

The side rail 26 can be a tubular member as shown in the figures, or can instead be constructed or one or more beams, bars, or other elongated elements having any cross-sectional shape (whether hollow or solid).

In some embodiments, the side rail 26 extends along the outer edge of the roof of the vehicle 14 between the front and rear cradles 18 and 22, respectively. As discussed further below, when an operator performs a loading or unloading operation, the operator can lean the ladder 34 against the side rail 26 to support the ladder 34. The main portion 300 can be positioned to prevent the ladder from contacting the vehicle 14, while the forward connecting portion 304 prevents the ladder 34 from sliding off the main portion 300. In other embodiments, the support member 50 is utilized to prevent the ladder from sliding off the main portion 300.

Figure 6:
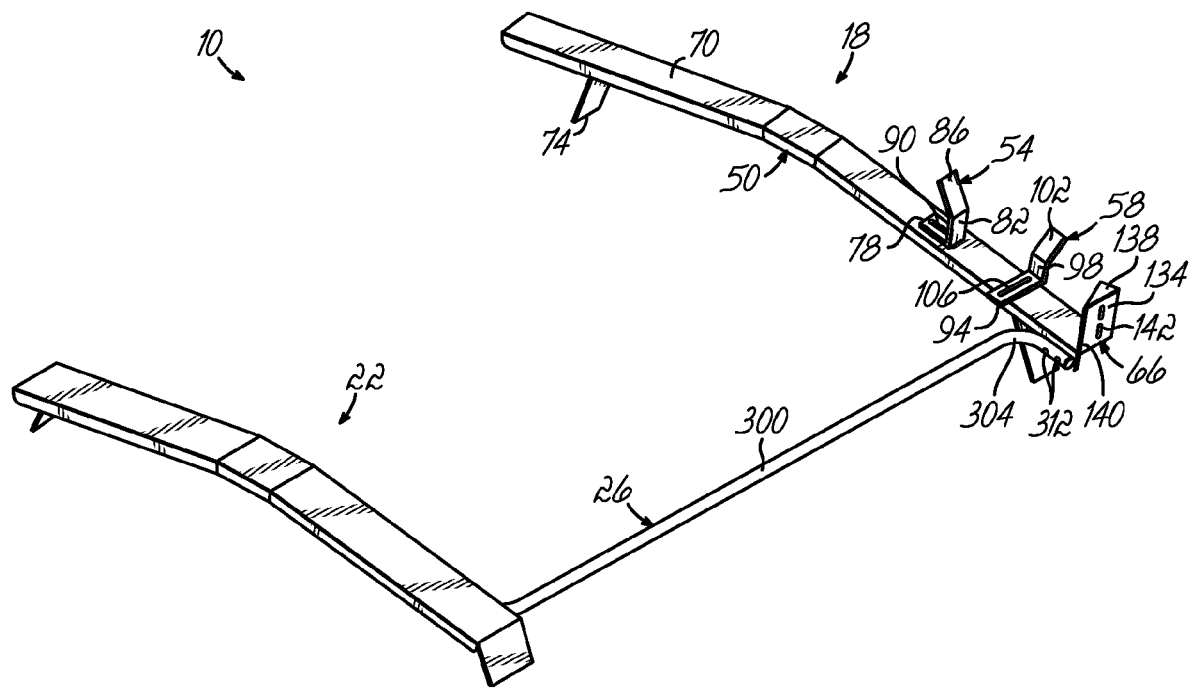
FIG. 6 is a rear perspective view of the ladder rack illustrated in FIGS. 1-5, shown removed from the vehicle.
Figure 8:
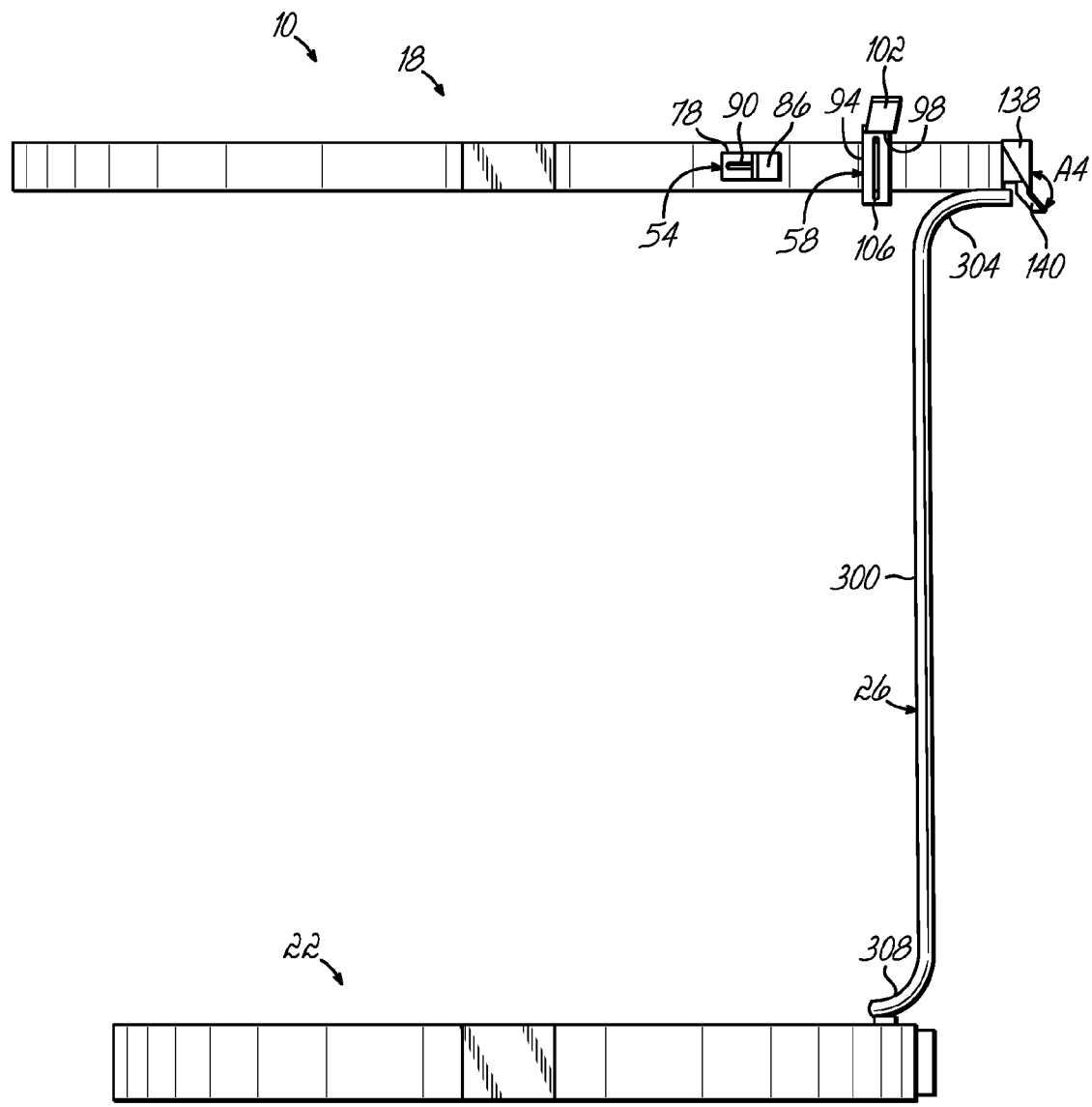
FIG. 8 is a top plan view of the ladder rack illustrated in FIGS. 1-7.

As shown in FIGS. 7 and 8, the forward connecting portion 304 of some embodiments includes one or more mounting apertures 312 that accept fasteners for coupling the forward connecting portion 304 to the side grip 66, side stop 62, cross rail 70, or another other portion of the support member 50. With reference to FIG. 6 for example, two mounting apertures 312 accept fasteners for coupling the forward connecting portion 304 of the side rail 26 to the support member 50. In some embodiments, the mounting apertures 312 provide a countersunk feature so that the heads of the fasteners are recessed within the surface of the side rail 26 when inserted.

In some embodiments, the forward connecting portion 304 is at an angle with respect to the main portion 300. For example, the forward connecting portion 304 can extend outwardly (away from the center of the vehicle 14 and from the main portion 300 of the side rail 26) to define a "dog-leg" of the side rail 26. As another example, the forward connecting portion 304 can be defined by a rod, bar, or other element extending at an angle away from the side rail 26 and from the center of the vehicle 14. The transition between the main portion 300 of the side rail 26 and the forward connecting portion 304 can be curved or otherwise smooth (such as a radiused corner as shown in the figures). A curved or other smooth transition can enable more controlled movement of the ladder 34 in the rack 10 as the rack 10 is moved between storage and loading/unloading positions. In still other embodiments, the transition is curved with a radius of between 3 inches and 6 inches. In still other embodiments, this radius of curvature is approximately 4 inches. In other embodiments, the transition can define an angle, or on more stepped surfaces between the side rail 26 and forward connecting portion 304, or any other transition desired.

As shown in FIG. 8, the rear connecting portion 308 of the side rail 26 in some embodiments includes one or more mounting apertures 312 that accept fasteners for coupling the rear connecting portion 308 of the side rail 26 to the rear cradle 22. In the illustrated embodiment for example, one mounting aperture 312 that accepts a fastener for coupling the rear connecting portion 308 to the rear cradle 22. The transition between the main portion 300 of the side rail 26 and the rear connecting portion 308 can take any of the forms described above with reference to the transition between the forward connecting portion 304 and the main portion 300. By way of example, the transition between the main portion 300 and the rear connecting portion 308 in the illustrated embodiment is smooth and curved. The rear connecting portion 308 can extend from the main portion 300 in any direction suitable for connection to the rear cradle. With reference again to the illustrated embodiment, the rear connecting portion 308 extends downwardly and inwardly towards the center of roof of the vehicle 14. Any other type of transition and orientation of the rear connecting portion 308 can be employed as desired. The rear connecting portion 308 can be transitioned upward or downward as needed from the main portion 300 to compensate for a difference in vertical height of the front and rear cradles 18 and 22, respectively.

The side rail 26 illustrated in the figures has three portions 300, 304, 308 as described above. However, it should be noted that the side rail 26 can take a number of different shapes having any number of portions while still enabling permanent or releasable connection of the side rail 26 to the front support member 50 and the rear cradle 22 in any conventional manner, and in some embodiments while still providing a forward portion 304 extending at an outward angle with respect to the rest of the side rail 26.

The side rail 26 described above and illustrated in the figures is connected to the front support member 50 and the rear cradle 22 via fasteners or in any other conventional manner. However, it should be noted that the side rail 26 need not necessarily be directly connected to the support member 50, cross rail 70, side stop 62, or side grip 66 and/or to the rear cradle 22. In such embodiments, the side rail 26 can be directly or indirectly connected to the vehicle 14 in other manners, such as by mounts extending from the side rail 26, by connection to other framework or structure attached to the vehicle 14, and the like.

Figure 2:
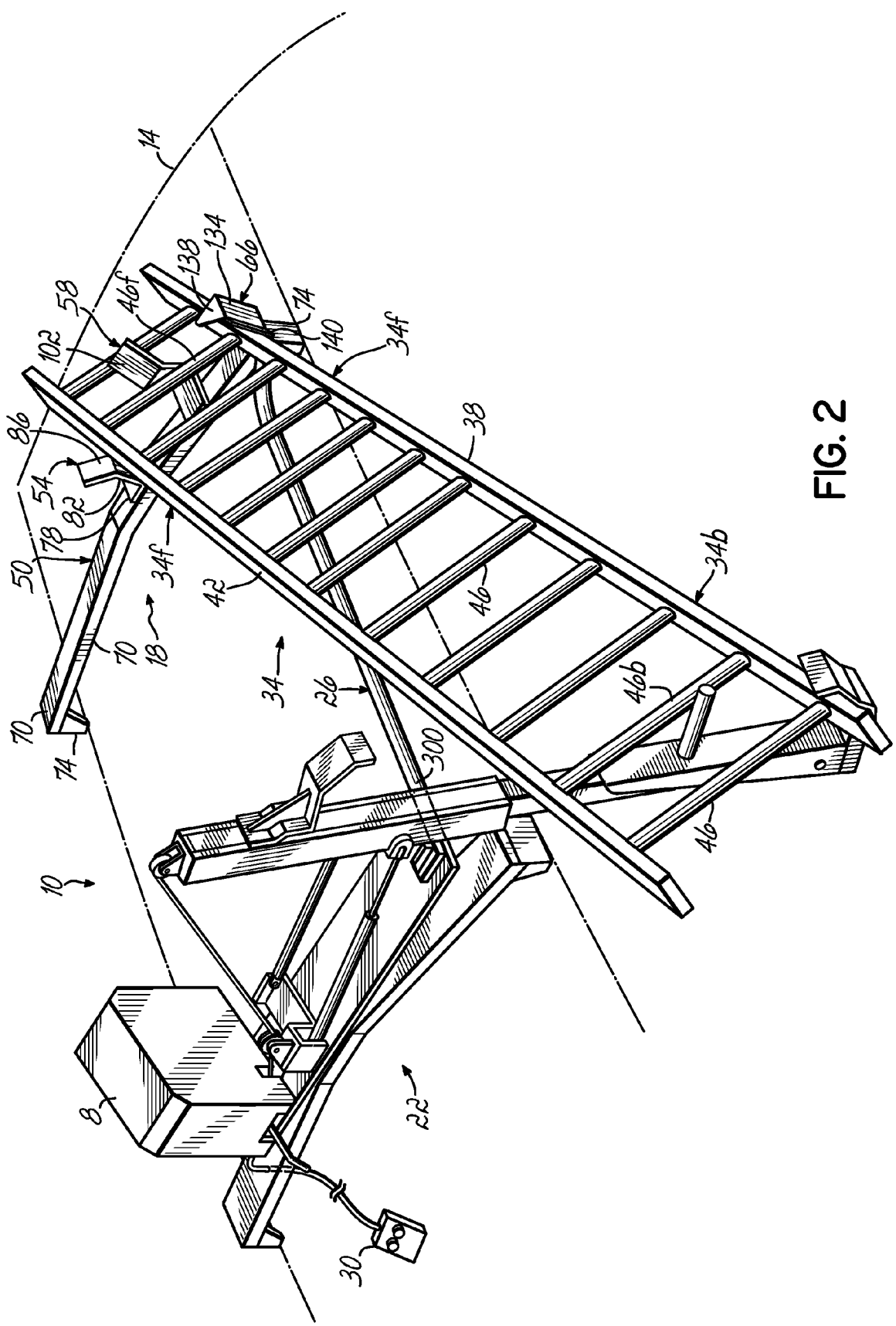
FIG. 2 is a perspective view of the ladder rack illustrated in FIG. 1, shown with the ladder rack in the load/unload position and with the ladder disposed on the ladder rack.

As shown in FIGS. 1 and 2, in some embodiments, a control box 30 is mounted inside the vehicle 14 and a cable or other conventional communications link couples the control box 30 to the motorized drive assembly 8 of the rear cradle 22. The control box 30 can be located anywhere inside or outside of the vehicle 14.

For a loading operation in the illustrated embodiment of the present invention, the operator places the ladder rack 10 in the load/unload position. If the ladder rack 10 is located in the storage/transport position, the user can actuate the motorized drive assembly 8 via the control box 30 (if employed) to move the ladder rack 10 to the load/unload position. The operator carries the ladder 34 to the vehicle 14 and leans a first or upper end portion 34*f* of the ladder 34 against the side rail 26. The operator ensures the ladder 34 is properly oriented with respect to the ladder rack 10 (e.g., when loading an extension ladder 34 is some embodiments of the ladder rack 10, the narrow side of the ladder 34 (i.e., the extension portion of the ladder 34) faces outward towards the operator, and the wide side of the ladder 34 (i.e., the main portion of the ladder) faces towards the vehicle 14). As the ladder 34 leans against the side rail 26, the first rail 38 of the ladder 38 rests against the forward connecting portion 304 of the side rail 26. In the illustrated embodiment for example, and with particular reference to FIG. 1, the first rail 38 of the ladder 34 rests against the forward connecting portion 304 or on the transition portion (connecting the forward connecting portion 304 and main portion 300 of the side rail 26), or on both portions of the side rail 26. The second rail 42 of the ladder 34 can rest against the main portion 300 of the side rail 26. The side rail 26 prevents the ladder 34 from resting directly against a portion of the vehicle 14, thereby preventing any damage to the vehicle 14. Further, because the operator need not be concerned with potential damage to the vehicle 14 by contact of the ladder 34 with the vehicle 14, the operator can first rest a second or lower end portion 34*b* of the ladder 34 on the ground when resting the first rail 38 of the ladder 34 against the side rail 26, thereby avoiding any awkward movement by the operator while trying to balance the ladder 34 on the ladder rack 10 before placing the second end portion 34*b* of the ladder 34 on the rear cradle 22.

The operator can then lift the second end portion 34*b* of the ladder 34 onto the rear cradle 22 so the rung 46*b* of the ladder 34 is appropriately contacting the rear cradle 22. In some embodiments, the rung 46*b* is the third rung from the end on the second end portion 34*b*. In other embodiments, the rung 46*b* varies based upon the length of the ladder 34 and the location of the front and rear cradles 18 and 22, respectively, on the vehicle 14. When the second end portion 34*b* of the ladder 34 is loaded onto the rear cradle 22, the first end portion 34*f* of the ladder continues to rest on the side rail 26 as described above.

Figure 3:
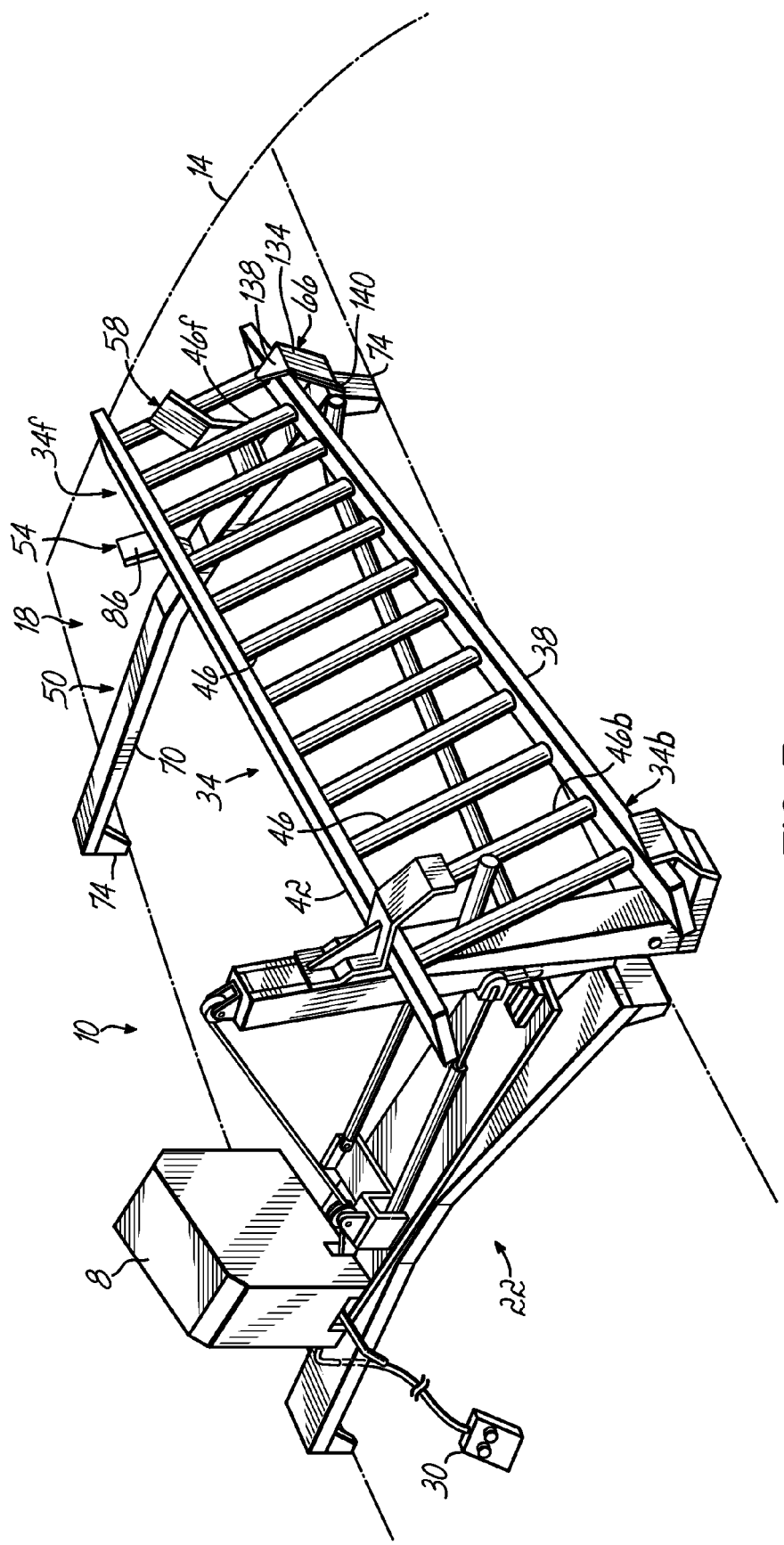
FIG. 3 is a perspective view of the ladder rack illustrated in FIGS. 1 and 2, shown with the ladder between its load/unload and storage/transport positions.

In motorized embodiments of the ladder rack 10 the operator can actuate the motorized drive assembly 8 via the control box 30 to move the ladder rack 10 from the load/unload position to the storage/transport position. In non-motorized embodiments, the operator can manually move the ladder rack 10 between these positions. With continued reference to the illustrated embodiment of the present invention as shown in FIGS. 2 and 3, as the rear cradle 22 (or operator) moves the ladder rack 10 towards the storage/transport position, the first end portion 34*f* of the ladder 34 moves toward the front cradle 18. The first rail 38 of the ladder 34 moves downward past the inboard end of the retaining portion 138 of the side grip 66, and the second rail 42 of the ladder 34 moves downward towards the guiding portion 86 of the side guide 54. The second rail 42 of the ladder 34 eventually contacts the guiding portion 86 of the side guide 54, which causes the second rail 42 of the ladder 34 to move laterally towards the side stop 62. As the second rail 42 of the ladder 34 moves laterally, so does the rest of the ladder 34 (including the first rail 38). The first rail 38 of the ladder 34 moves under the retaining portion 138 of the side grip 66. If the rung 46*b* of the ladder 34 is not appropriately contacting the rear cradle 22, the rung 46*f* can contact the guiding portion 102 of the front guide 58, causing the ladder 34 to move longitudinally rearwardly towards the rear cradle 22. In some embodiments, the side rail 26 thus prevents the ladder 34 from contacting the vehicle 14 during moving of the ladder 34 between a load/unload position and a storage/transport position of the ladder rack 10.

As shown in FIG. 4, the ladder rack 10 eventually reaches the storage/transport position where the first and second rails 38 and 42, respectively, of the ladder 34 are contained from horizontal movement by the retaining members 82 and 110 of the side guide 54 and side stop 62, respectively. The first rail 38 of the ladder 34 is contained from vertical movement by the cross rail 70 and/or the mounting portions 94, 78 of the front and side guides 58, 54, and the retaining portion 138 of the side grip 66, and the ladder 34 is contained from longitudinal movement by the rear cradle 22 in the rear and the retaining portion 98 of the front guide 58 in the front. Although the second rail 42 of the ladder 34 is not directly contained from vertical movement in some embodiments, containment of the other directions of movement results in the inability of the first rail 38 to move vertically.

In an unloading operation in the illustrated embodiment of the present invention, the operator actuates the motorized drive assembly 8 via the control box 30 or manually moves the ladder rack 10 from the storage/transport position to the load/unload position. As the rear cradle 22 moves the ladder rack 10 towards the load/unload position, the first end portion 34*f* of the ladder 34 moves away from the front cradle 18. The second rail 42 of the ladder 34 moves upwardly and sidewardly away from the center of the roof of the vehicle 14. The first rail 38 of the ladder 34 moves sidewardly away from the side stop 62 and out from under the retaining portion 138 of the side grip 66. The first end portion 34*f* of the ladder 34 is then clear of the retaining portions 82, 98, 110, and 138 of the side guide 54, front guide 58, side stop 62 and side grip 66, respectively of the front cradle 18 and continues to move back towards its resting position against the side rail 26. Once the ladder rack 10 reaches the load/unload position, the operator can unload the second end portion 34*b* of the ladder 34 from the rear cradle 22 and can rest it on the ground. The ladder 34 is then completely removed from the support of the vehicle 14 and can be utilizes as the operator desires. Accordingly, with the above-described loading operation, the ladder 34 in some embodiments is prevented from contacting the vehicle 14 during the movement of the ladder 34 between a storage/transport position and a load/unload position of the ladder rack 10.

The operator may choose to leave the ladder rack 10 in the load/unload position until the operator returns with the ladder 34. Alternatively, the operator can return the unloaded ladder rack 10 to the storage/transport position while the ladder is in use.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, the front cradle 18 of the ladder rack 10 illustrated in the figures is defined at least in part by side and front guides 54, 58, a side stop 62, and a side grip 66. However, it should be noted that the front cradle 18 need not necessarily operate to "cradle" the ladder 34. In particular, alternative embodiments of the ladder rack 10 can include any number of these elements operating alone or in combination to guide and/or retain the front of the ladder 34 on the vehicle 14. Accordingly, some embodiments of the present invention employ less than all of these elements 54, 58, 62, 66 in any combination (or alone) as desired.

In addition, the front cradle 18 of the present invention need not necessarily be located at or near the front of a vehicle in which the ladder rack 10 is mounted. The terms "front" and "rear" are employed in the present application by way of description and illustration only. The ladder rack 10 according to the present invention can be oriented on a vehicle 14 in any other manner desired, such as in a direction that is reversed with respect to the mounting orientation illustrated in the figures. Also, the front cradle 18 need not necessarily be a stationary structure, and can instead by defined as part of a movable structure, such as in the case where the front support member 50 (or part thereof) is pivotable or otherwise movable between the storage and loading/unloading positions of the ladder rack.

Accordingly, we intend to be limited only by the following claims.

We claim:

1. A motorized ladder rack for loading or unloading a ladder on a vehicle, said motorized ladder rack comprising:
   a stationary front cradle secured to said vehicle, said front cradle including a support member, a side guide removably secured to the support member, a front guide removably secured to the support member, and a side stop removably secured to the support member;
   a rear cradle secured to said vehicle;
   a side rail stationary relative to said vehicle for supporting a ladder during said loading and unloading, said side rail having a straight portion and two curved portions at the ends of the straight portion, one of said curved portions being secured to said front cradle and the other of said curved portions being secured to a portion of said rear cradle;
   wherein a portion of said rear cradle is movable between a first position and a second position by activation of a motorized drive assembly.

2. The motorized ladder rack of claim 1 wherein said side guide includes a horizontally extending mounting portion, a vertically extending retaining portion extending upwardly from said mounting portion and a guiding portion extending upwardly and outwardly from said mounting portion at a fixed angle relative to said mounting portion.

3. The motorized ladder rack of claim 2 wherein said fixed angle is between 125 and 165 degrees.

4. The motorized ladder rack of claim 2 wherein said mounting portion and said guiding portion of said side guide are on the same side of said retaining portion.

5. The motorized ladder rack of claim 2 wherein said horizontally extending mounting portion of said side guide has at least one aperture for connection to the support member.

6. The motorized ladder rack of claim 1 wherein said side guide is adjustable relative to said support member.

7. The motorized ladder rack of claim 1 wherein said front guide extends forwardly from the support member.

8. The motorized ladder rack of claim 1 wherein said front guide includes a horizontally extending mounting portion, a vertically extending retaining portion extending upwardly from said mounting portion and a guiding portion extending upwardly and outwardly from said mounting portion at a fixed angle relative to said mounting portion.

9. The motorized ladder rack of claim 8 wherein said fixed angle is between 115 and 155 degrees.

10. The motorized ladder rack of claim 8 wherein said horizontally extending mounting portion of said front guide has at least one aperture for connection to the support member.

11. The motorized ladder rack of claim 1 wherein said front guide is adjustable relative to said support member.

12. The motorized ladder rack of claim 1 wherein said side stop includes a vertically extending retaining portion extending upwardly from a mounting portion, the mounting portion having a horizontally extending portion and tab portions extending downwardly from the horizontally extending portion.

13. The motorized ladder rack of claim 1 wherein said side rail has a circular cross-sectional configuration.

14. The motorized ladder rack of claim 1 wherein at least one portion of said side rail is curved.

15. A motorized ladder rack for loading or unloading a ladder on a vehicle, said motorized ladder rack comprising:
    a stationary front cradle secured to said vehicle, said front cradle including a support member, a side guide secured to the support member, a front guide secured to the support member, and a side stop removably secured to the support member, said front and side guides being adjustable relative to said support member;
    a rear cradle secured to said vehicle;
    a side rail stationary relative to said vehicle, secured to said front cradle and a stationary portion of said rear cradle and extending therebetween, said side rail having a straight portion and two curved portions at the ends of the straight portion;
    wherein a portion of said rear cradle is movable between a first position and a second position by activation of a motorized drive assembly.

16. The motorized ladder rack of claim 15 further comprising a side grip connected to the side stop, the side grip having a vertically oriented mounting portion and horizontally oriented retaining portion to prevent upward movement of a ladder.

17. The motorized ladder rack of claim 15 wherein said side rail includes a linear portion and a curved portion secured to said linear portion.

18. The motorized ladder rack of claim 15 wherein said curved portion of said side rail extends outwardly from said linear portion of said side rail.

19. The motorized ladder rack of claim 15 wherein said side rail includes a linear portion and curved portions secured to said linear portion at the ends thereof.

20. A motorized ladder rack for loading or unloading a ladder on a vehicle, said motorized ladder rack comprising:
    a stationary front cradle secured to said vehicle, said front cradle including a support member stationary relative to said vehicle, a side guide secured to the support member, a front guide secured to the support member, and a side stop secured to the support member;
    a rear cradle secured to said vehicle;
    a side rail stationary relative to said vehicle, secured to said front cradle and a stationary portion of said rear cradle and extending therebetween, said side rail having a straight portion and two curved portions at the ends of the straight portion;
    wherein a portion of said rear cradle is movable between a first position and a second position by activation of a motorized drive assembly and wherein said side and front guides are removably secured to said support member.

21. The motorized ladder rack of claim 15 wherein said front guide is adjustable relative to said support member.

* * * * *

UNITED STATES PATENT AND TRADEMARK OFFICE
CERTIFICATE OF CORRECTION

PATENT NO. : 7,549,831 B2 Page 1 of 1
APPLICATION NO. : 11/425272
DATED : June 23, 2009
INVENTOR(S) : John H. Hendley et al.

It is certified that error appears in the above-identified patent and that said Letters Patent is hereby corrected as shown below:

Column 3

Line 14, "so can" should be --so it can--.

Column 5

Line 24, "(UIIMW)" should be --(UHMW)--.

Line 24, "#IIIISS-0432-C)" should be --(HHSS-0432-C)--.

Column 7

Line 59, "As best show" should be --As best shown--.

Column 9

Line 62, "convention" should be --conventional--.

Column 14

Line 43, "can be utilizes" should be --can be utilized--.

Column 16

Line 63, "claim 15" should be --claim 20--.

Signed and Sealed this

Sixteenth Day of February, 2010

David J. Kappos
*Director of the United States Patent and Trademark Office*